(12) United States Patent
Takeda et al.

(10) Patent No.: US 7,905,254 B2
(45) Date of Patent: Mar. 15, 2011

(54) SHUT-OFF VALVE

(75) Inventors: Tomohisa Takeda, Imabari (JP); Masato Kitayama, Matsuyama (JP)

(73) Assignee: Miura Co., Ltd., Matsuyama-shi (JP)

( * ) Notice: Subject to any disclaimer, the term of this patent is extended or adjusted under 35 U.S.C. 154(b) by 1081 days.

(21) Appl. No.: 11/658,669

(22) PCT Filed: Jul. 27, 2005

(86) PCT No.: PCT/JP2005/014151
§ 371 (c)(1),
(2), (4) Date: Jan. 29, 2007

(87) PCT Pub. No.: WO2006/011639
PCT Pub. Date: Feb. 2, 2006

(65) Prior Publication Data
US 2009/0189101 A1 Jul. 30, 2009

(30) Foreign Application Priority Data

Jul. 29, 2004 (JP) ................................. 2004-222208
Jul. 29, 2004 (JP) ................................. 2004-222209

(51) Int. Cl.
*F16K 39/02* (2006.01)
(52) U.S. Cl. ............... 137/630; 251/129.19; 137/630.22
(58) Field of Classification Search .................. 137/557, 137/614.11, 628, 630, 630.19, 630.16, 630.21, 137/630.22; 251/77, 82, 129.01, 129.19
See application file for complete search history.

(56) References Cited

U.S. PATENT DOCUMENTS

| | | | | |
|---|---|---|---|---|
| 2,392,741 A | * | 1/1946 | Hurlburt | 137/630.22 |
| 2,639,693 A | * | 5/1953 | Miller et al. | 251/77 |
| 2,830,620 A | * | 4/1958 | Shuptrine | 137/630.19 |
| 3,029,835 A | | 4/1962 | Biello et al. | |
| 3,194,268 A | * | 7/1965 | Vicenzi et al. | 137/630.19 |
| 3,344,807 A | | 10/1967 | Lehrer et al. | |
| 3,424,427 A | | 1/1969 | Ruchser et al. | |
| 3,548,868 A | | 12/1970 | Mullaney, III | |
| 3,789,297 A | | 1/1974 | Frolich | |
| 4,049,017 A | | 9/1977 | Jones | |
| 4,557,463 A | * | 12/1985 | Tripp et al. | 137/630.19 |
| 4,637,430 A | | 1/1987 | Scheffel et al. | |

(Continued)

FOREIGN PATENT DOCUMENTS

JP 52-17245 B2 5/1977

(Continued)

*Primary Examiner* — Stephen M Hepperle
*Assistant Examiner* — Craig Price
(74) *Attorney, Agent, or Firm* — Birch, Stewart, Kolasch & Birch, LLP

(57) ABSTRACT

A cutoff valve having an upstream valve part and a downstream valve part which are assembled in series in a flow passage. Each of the valve elements at the valve parts are formed separably stacking a large diameter first valve element and a small diameter second valve element on each other. The first valve element is formed of elastic material and the second valve element is formed of rigid material. A valve shaft is passed through the center of the first valve element, and the tip of the valve shaft is connected to the second valve element. A first valve element moving component which moves the center part of the first valve element in a direction apart from the second valve element in the state of being engaged with the first valve element when the valve is opened is installed between the first valve element and the valve shaft.

10 Claims, 6 Drawing Sheets

U.S. PATENT DOCUMENTS

| | | |
|---|---|---|
| 4,766,930 A | 8/1988 | Patti |
| 4,922,957 A | 5/1990 | Johnson |
| 5,193,577 A | 3/1993 | de Koning |
| 5,226,445 A | 7/1993 | Surjaatmadja |
| 5,280,807 A * | 1/1994 | Frey et al. .................... 137/557 |
| 5,546,981 A | 8/1996 | Li et al. |
| 5,597,009 A | 1/1997 | Scherrer et al. |
| 6,959,718 B2 | 11/2005 | Kayahara et al. |
| 7,334,603 B2 * | 2/2008 | Takeda .......................... 137/511 |
| 7,347,221 B2 * | 3/2008 | Berger et al. ............ 137/630.22 |
| 2003/0161375 A1 | 8/2003 | Filgas et al. |
| 2004/0075072 A1 | 4/2004 | Lanting et al. |

FOREIGN PATENT DOCUMENTS

| | | |
|---|---|---|
| JP | 2003-161375 A | 6/2003 |
| JP | 2003-232456 A | 8/2003 |
| JP | 2005-83563 A * | 3/2005 |

* cited by examiner

SHUT-OFF VALVE

TECHNICAL FIELD

The present invention relates to a shut-off valve suitable for use in a gas fired boiler, a gas combustion apparatus or the like.

BACKGROUND ART

An excellent shut-off performance is required of a shut-off valve used in a gas fired boiler, a gas combustion apparatus or the like. As a conventional shut-off valve in which an improvement in shut-off performance has been achieved, the following shut-off valve is known. In this shut-off valve, a valve seat is provided in a flow passage of a valve casing equipped with a fluid inlet and a fluid outlet, and a valve body, which is connected to an electromagnetic valve opening means and which is supported by the forward end of a valve operating shaft adapted to move axially, is urged by a compression spring to be brought into contact with the valve seat, and is caused to move away from the valve seat by the electromagnetic valve opening means. The valve seat is composed of a first valve seat portion formed on the inlet side with respect to a valve hole as a center, and a second valve seat portion formed on the outlet side and of a smaller diameter than the first valve seat portion. Further, the valve body is composed of a first valve body portion of a large diameter in contact with the first valve seat portion, and a second valve body portion of a small diameter in contact with the second valve seat portion, with the first and second valve seat portions being superimposed one upon the other to be integrated with each other (see JP 2003-161375 A).

In the above-described shut-off valve, when opening the valve, the valve body is separated from the valve seat against the elastic force of the compression spring by the attracting force of the electromagnetic valve opening means to thereby open the valve hole. At this time, the fluid pressure in the fluid passage acts on the valve body, so that the attracting force of the electromagnetic valve opening means is required to be strong enough to overcome the elastic force of the compression spring and the fluid pressure in the flow passage. The fluid pressure on the valve body is in proportion to the pressure reception area of the valve body, so that the larger the diameter of the valve body, the larger the fluid pressure on the valve body, and the larger the electromagnetic valve opening means, resulting in an increase in cost.

In the above-described conventional shut-off valve, the fluid pressure acts on the first valve body portion of a large diameter on the fluid inlet side, so that it is necessary to provide an electromagnetic valve opening means having an attracting force stronger than the fluid pressure acting on the first valve body portion of a large diameter at the time of valve opening. Thus, when compared with a valve body composed of a single valve body portion, it involves an increase in the size of the electromagnetic valve opening means, resulting in an increase in cost.

DISCLOSURE OF THE INVENTION

It is an object of the present invention to provide a shut-off valve allowing valve opening with a smaller force than in the prior art even when the outer diameter of the first valve body portion on the fluid inlet side, on which the fluid pressure acts, is large.

The object of the present invention is achieved by a shut-off valve in which a valve seat is provided in a flow passage of a valve casing equipped with a fluid inlet and a fluid outlet, and in which a valve body, supported at a forward end of a valve operating shaft connected to electromagnetic opening/closing means and adapted to move axially with respect to the valve seat, is urged by a compression spring to be brought into contact with the valve seat, and is separated from the valve seat by the electromagnetic opening/closing means, characterized in that: the valve seat is composed of a first valve seat portion formed on an inlet side of a valve hole as a center, and a second valve seat portion formed on an outlet side of the valve hole and of a smaller diameter than the first valve seat portion; the valve body is composed of two valve body portions separably superimposed one upon the other, that is, a first valve body portion with a large diameter in contact with the first valve seat portion, and a second valve body portion with a small diameter in contact with the second valve seat portion; the first valve body portion is formed of an elastic material, whereas at least the portion of the second valve body portion other than the portion thereof in contact with the second valve seat portion is formed of a rigid material; a through-hole through which the valve operating shaft is passed is formed at the center of the first valve body portion; the forward end of the valve operating shaft passed through the through-hole is connected to the second valve body portion; between the first valve body portion and the valve operating shaft, a first valve body portion moving means is provided, which is adapted to make mutual engagement at the time of valve opening to cause a central portion of the first valve body portion to move away from the second valve body portion; and at the position where the forward end of the valve operating shaft and the second valve body portion are connected together, a second valve body portion valve opening operation delaying means is provided, which, at the time of valve opening, delays the valve opening operation of the second valve body portion, and gives priority to the operation of moving the first valve body portion by the first valve body portion moving means.

In this construction, when, at the time of valve opening, the valve operating shaft is moved away from the valve seat by the electromagnetic valve opening means, the second valve body portion is not immediately separated from the valve seat due to the second valve body portion valve opening operation delaying means, but the central portion of the first valve body portion is first moved away from the second valve body portion by the first valve body portion moving means provided between the first valve body portion and the valve operating shaft. The first valve body portion, which has been moved by the first valve body portion moving means, is formed of an elastic material, so that the central portion thereof is deformed and is moved away from the second valve body portion, with the result that a gap is generated between the first valve body portion and the second valve body portion. As a result, the fluid in the portion of the flow passage on the upstream side of the first valve body portion flows through the through-hole formed at the center of the first valve body portion, and enters the gap generated between the first valve body portion and the second valve body portion, with the result that the difference in pressure between the upstream side and the downstream side of the first valve body portion is eliminated and, at the same time, the first valve body portion is separated from the first valve seat portion. As a result of the subsequent movement of the valve operating shaft, the second valve body portion, to which the forward end of the valve operating shaft is connected, is separated from the second valve seat portion, thereby opening the valve.

Thus, it is possible to derive the requisite attracting force of the electromagnetic valve opening means for the separation of the valve body from the valve seat by using the pressure reception area of the second valve body portion of a small diameter as a reference, so that, as compared with the conventional shut-off valve, in which the requisite attracting force is derived by using the pressure reception area of the first valve body portion of a large diameter as a reference, it is possible to diminish the attracting force of the electromagnetic valve opening means, so it is possible to achieve a reduction in the size of the electromagnetic valve opening means, and a reduction in cost.

The portion of the second valve body portion which is in contact with the second valve seat portion is formed of an elastic material.

In this construction, even if the other portion of the second valve body portion is formed of a rigid material, it is possible to sufficiently secure the seal performance between the second valve body portion and the second valve seat portion.

The first valve seat portion and the first valve body portion are held in surface contact with each other, and the second valve seat portion and the second valve body portion are held in line contact with each other.

In this construction, due to the second valve seat portion and the second valve body portion which are in line contact with each other, it is possible to achieve an improvement in terms of seal performance, and due to the first valve seat portion and the first valve body portion which are in surface contact with each other, it is possible to stabilize the seal performance.

The portion of the second valve body portion in contact with the second valve seat portion is formed of an elastic material as a valve seat contact portion, and the remaining portion thereof is formed of a rigid material as a main body portion, and an outer peripheral portion of a base portion of the main body portion retaining the valve seat contact portion does not hinder circulation of a fluid having passed through the through-hole of the first valve body portion at the time of valve opening.

In this construction, at the time of valve closing, there is no sealing property due to the outer peripheral portion of the base portion of the main body portion of the second valve body portion formed of a rigid material. Thus, at the time of valve opening, the outer peripheral portion of the base portion of the main body portion of the second valve body portion formed of a rigid material does not hinder the valve opening operation, and it is possible to open the valve with a valve opening force derived by using the pressure reception area of the valve seat contact portion of the second valve body portion in contact with the second valve seat portion as a reference.

The outer peripheral portion of the base portion of the main body portion retaining the valve seat contact portion is cut out so that it may not hinder circulation of the fluid having passed through the through-hole of the first valve body portion at the time of valve opening.

In this construction, the structure is simple and can be easily produced.

The first valve body portion moving means provided between the first valve body portion and the valve operating shaft is composed of a hard engagement member provided at the center of the first valve body portion and protruding into the through-hole of the first valve body portion, and an engagement protrusion protruding from the outer periphery of the valve operating shaft and engaged with the lower surface of the engagement member at the time of valve opening.

In this construction, at the time of valve opening, the engagement protrusion protruding from the outer periphery of the valve operating shaft is engaged with the lower surface of the engagement member protruding into the through-hole of the first valve body portion, and reliably raises the central portion of the first valve body portion, making it possible to generate a gap between the first valve body portion and the second valve body portion.

The second valve body portion valve opening operation delaying means is provided with an attitude maintaining mechanism for maintaining the second valve body portion in an attitude perpendicular to the valve operating shaft from valve opening to valve closing.

In this construction, from valve opening to valve closing, the second valve body portion is maintained by the attitude maintaining mechanism in the attitude in which it is perpendicular to the valve operating shaft, so that there is no fear of the second valve body portion being inclined with respect to the valve operating shaft at the time of valve closing, and is directly opposed to the second valve seat portion to come into contact therewith in the normal attitude, so it is possible to sufficiently secure the seal performance for the second valve body portion and the second valve seat portion at the time of valve closing.

The second valve body portion valve opening operation delaying means provided with the attitude maintaining mechanism is composed of a head portion provided at the forward end of the valve operating shaft and a bottomed cylindrical portion provided in the second valve body portion, fit-engaged with the head portion so as to allow its axial movement by a predetermined dimension and preventing detachment of the same, and between the opening side of the bottomed cylindrical portion and the forward end side of the head portion, an attitude maintaining compression spring is provided, which urges the bottom portion of the bottomed cylindrical portion to press it against the forward end of the head portion and which maintains the second valve body portion in an attitude perpendicular to the valve operating shaft from valve opening to valve closing, thus forming the attitude maintaining mechanism.

In this construction, the second valve body portion valve opening operation delaying means equipped with the attitude maintaining mechanism is composed of a head portion provided at the forward end of the valve operating shaft, and a bottomed cylindrical portion provided in the second valve body portion, fit-engaged with the head portion so as to allow its axial movement by a predetermined dimension, and preventing detachment of the same, so that the second valve body portion is not separated from the valve seat until the valve operating shaft has moved by the predetermined dimension at the time of valve opening, and while the valve operating shaft moves by the predetermined distance, the central portion of the first valve body portion is moved away from the second valve body portion by the first valve body portion moving means, making it possible to generate a gap between the first valve body portion and the second valve body portion.

Then, between the opening side of the bottomed cylindrical portion and the forward end side of the head portion, the attitude maintaining compression spring is provided, which urges the bottom portion of the bottomed cylindrical portion so as to press it against the forward end of the head portion and which maintains the second valve body portion in an attitude in which it is perpendicular to the valve operating shaft from valve opening to valve closing, so that the attitude maintaining mechanism is composed, when, through movement of the valve operating shaft, the attitude maintaining compression spring provided between the opening side of the bottomed cylindrical portion and the forward end side of the head portion is compressed, and when the second valve body portion is separated from the second valve seat portion through further movement of the valve operating shaft, the bottom portion of the bottomed cylindrical portion is urged by the resilient force of the compressed attitude maintaining compression spring so as to be pressed against the forward end of the head portion, and the first valve body portion and the second valve body portion are brought into contact with each other, making it possible to maintain the second valve body portion in an attitude in which it is perpendicular to the valve operating shaft from valve opening to valve closing.

The valve portion is composed of an upstream side valve portion and a downstream side valve portion incorporated in series into the flow passage of the valve casing provided with the fluid inlet and the fluid outlet.

In this construction, it is possible to cut off the flow passage by the two valve portions, so it is possible to obtain a shut-off valve superior in shut-off property. Even if fluid leakage occurs in either of the upstream side valve portion and the downstream side valve portion, the other valve body cuts off the flow passage, so that it is possible to obtain a shut-off valve of a high level of safety.

In the flow passage portion on the upstream side of the upstream side valve portion, an upstream side pressure sensor for detecting the pressure in the flow passage portion is arranged, in the flow passage portion between the upstream side valve portion and the downstream side valve portion, there is arranged a midstream portion pressure sensor for detecting the pressure in the flow passage portion, and in the flow passage portion on the downstream side of the downstream side valve portion, a downstream side pressure sensor for detecting the pressure is arranged in the flow passage portion.

With this construction, the respective pressures in the following portions of the flow passage: the portion on the upstream side of the upstream side valve portion, the portion between the upstream side valve portion and the downstream side valve portion, and the portion on the downstream side of the downstream side valve portion, are detected by the upstream side pressure sensor, the midstream portion pressure sensor, and the downstream side pressure sensor, so it is possible to make an assessment as to leakage in the upstream side valve portion and the downstream side valve portion from the pressures detected, making it possible to obtain a shut-off valve of a still higher level of safety.

BEST MODE FOR CARRYING OUT THE INVENTION

The present invention will be described in more detail with reference to the accompanying drawings.

Figure 1:
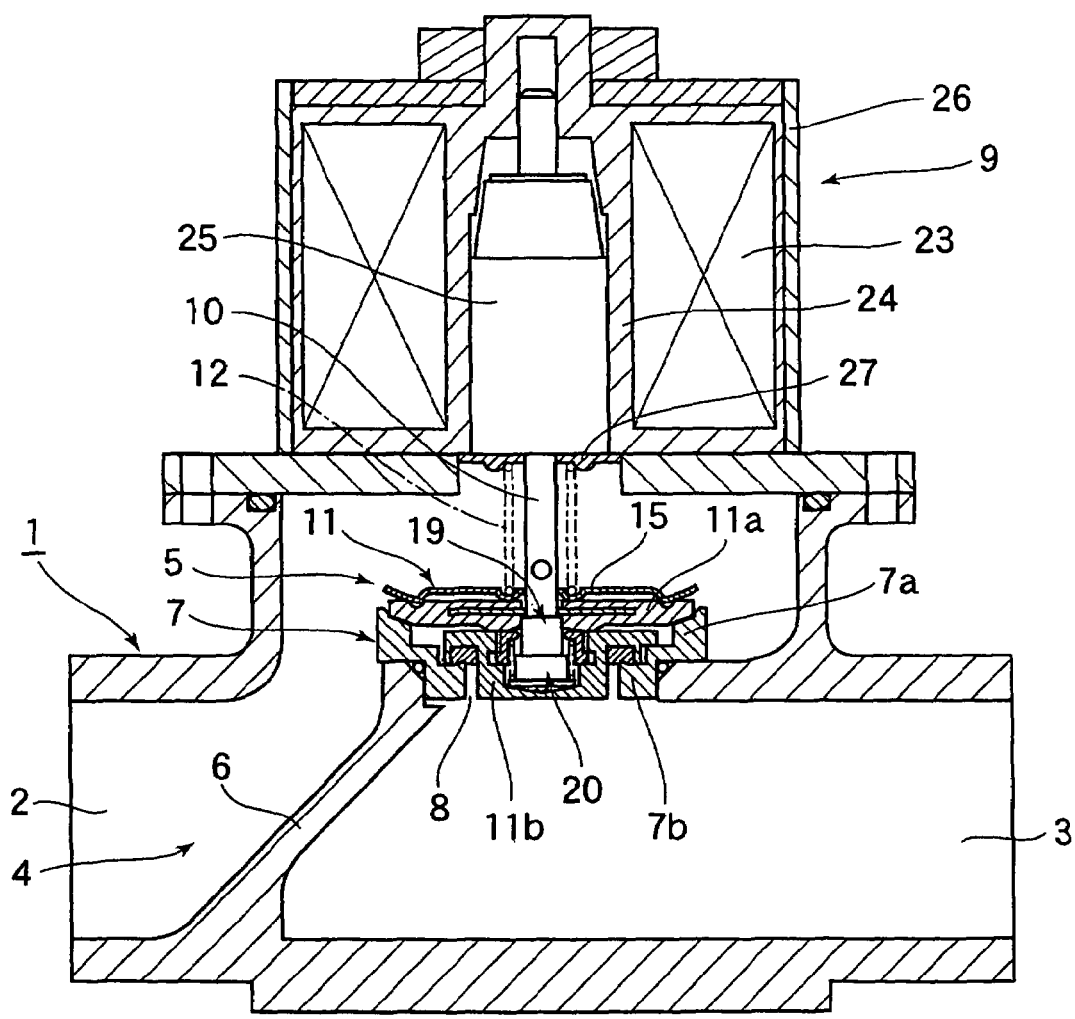
FIG. 1 is a longitudinal sectional view of a first example of a mode of the shut-off valve of the present invention.
Figure 2:
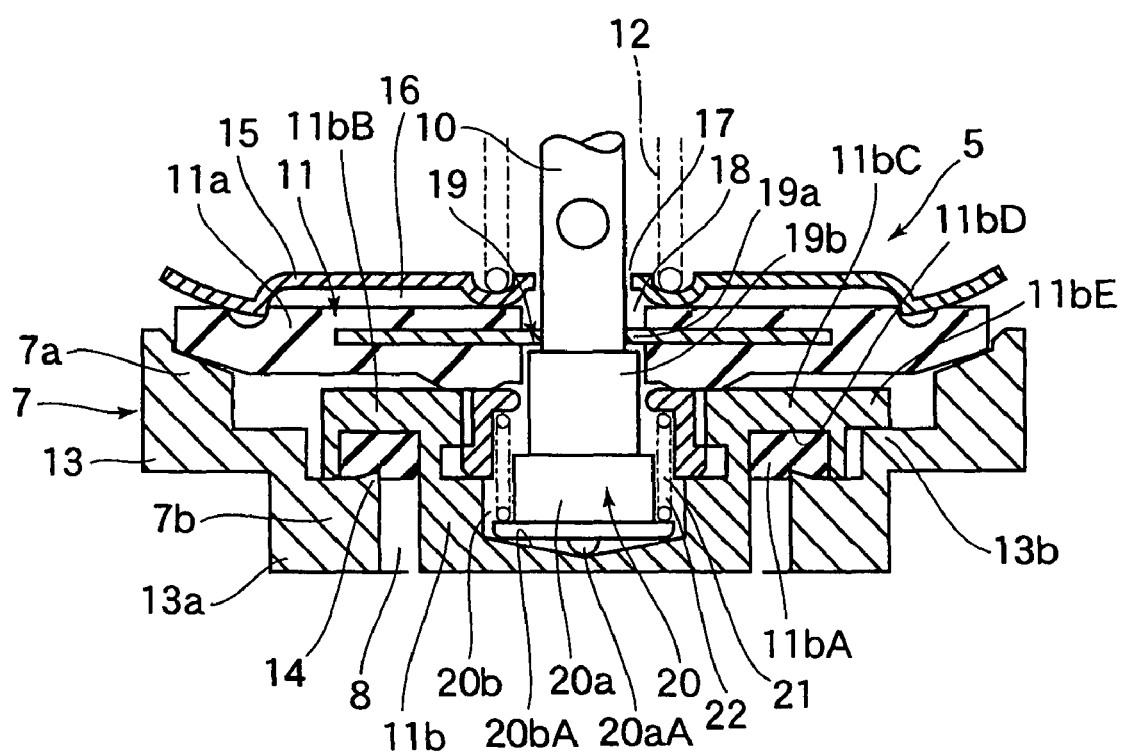
FIG. 2 is a sectional view of a valve-seat/valve-body portion of FIG. 1.
Figure 3:
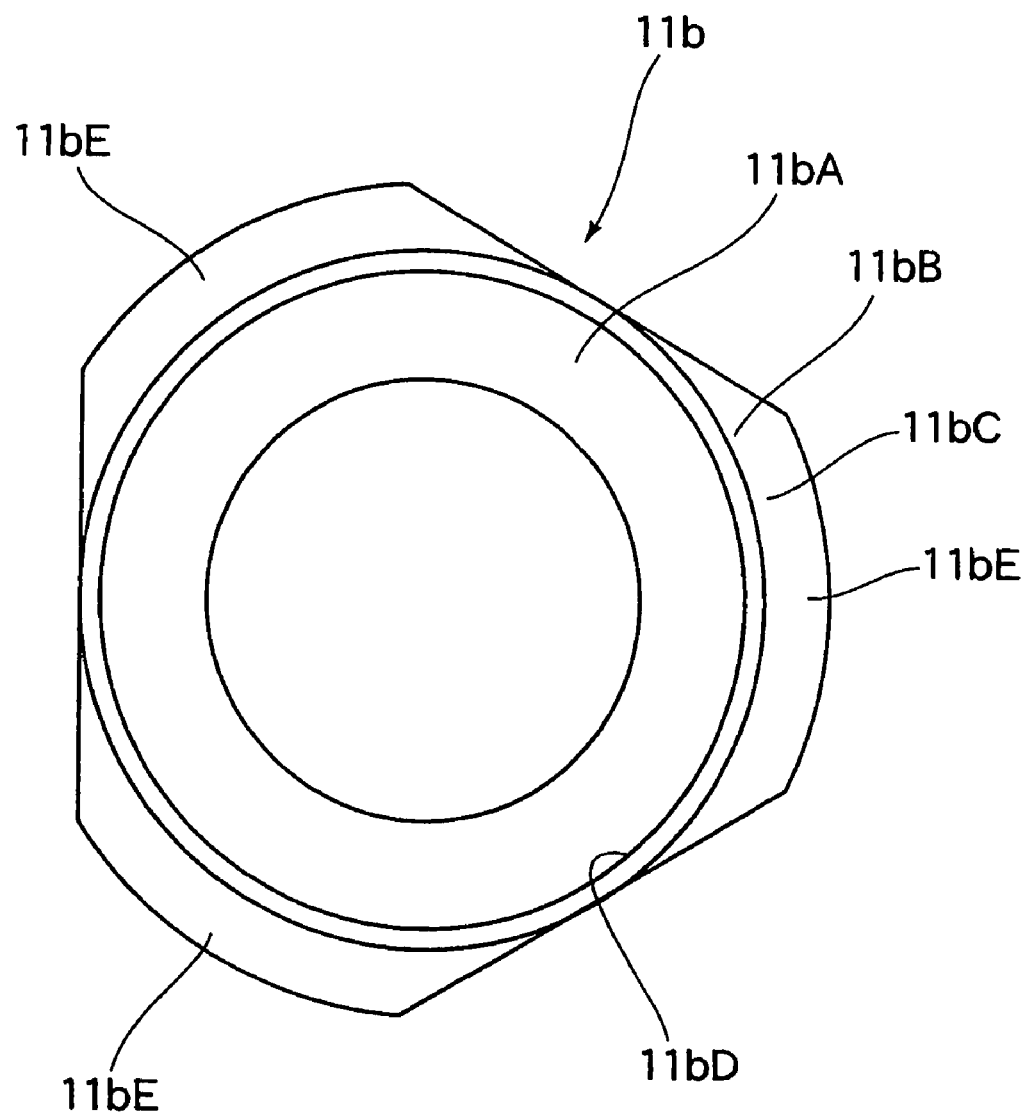
FIG. 3 is a bottom view of a second valve body portion shown in FIG. 1.
Figure 4:
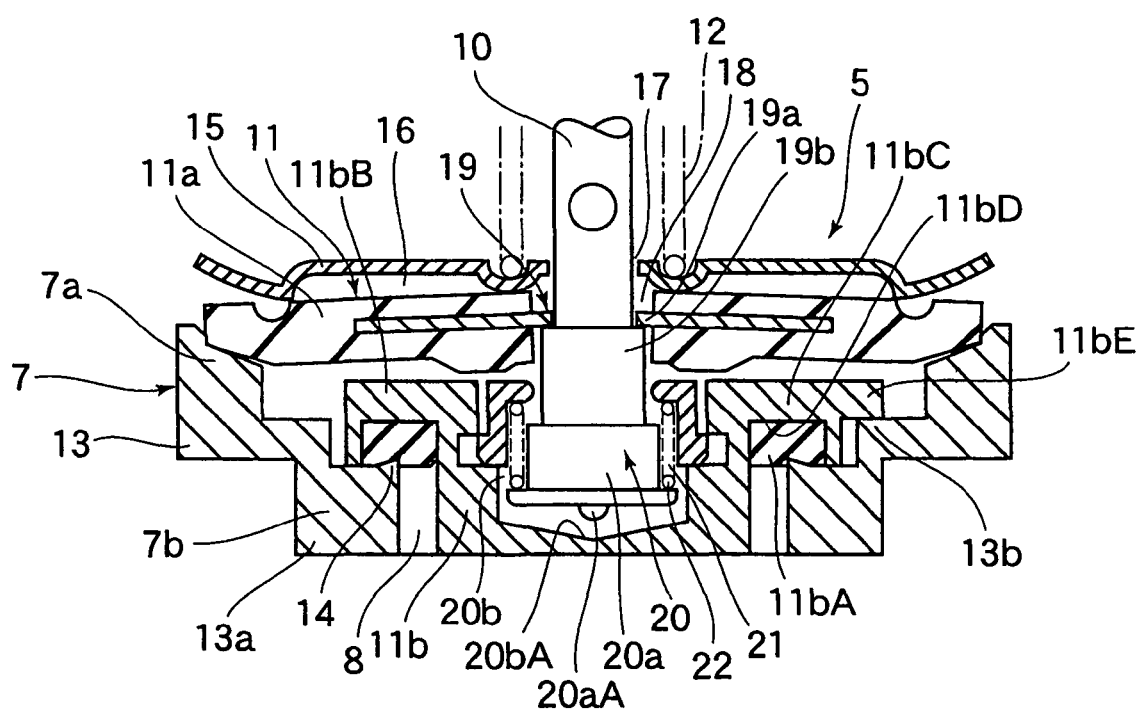
FIG. 4 is an explanatory view illustrating the valve opening operation of this example.
Figure 5:
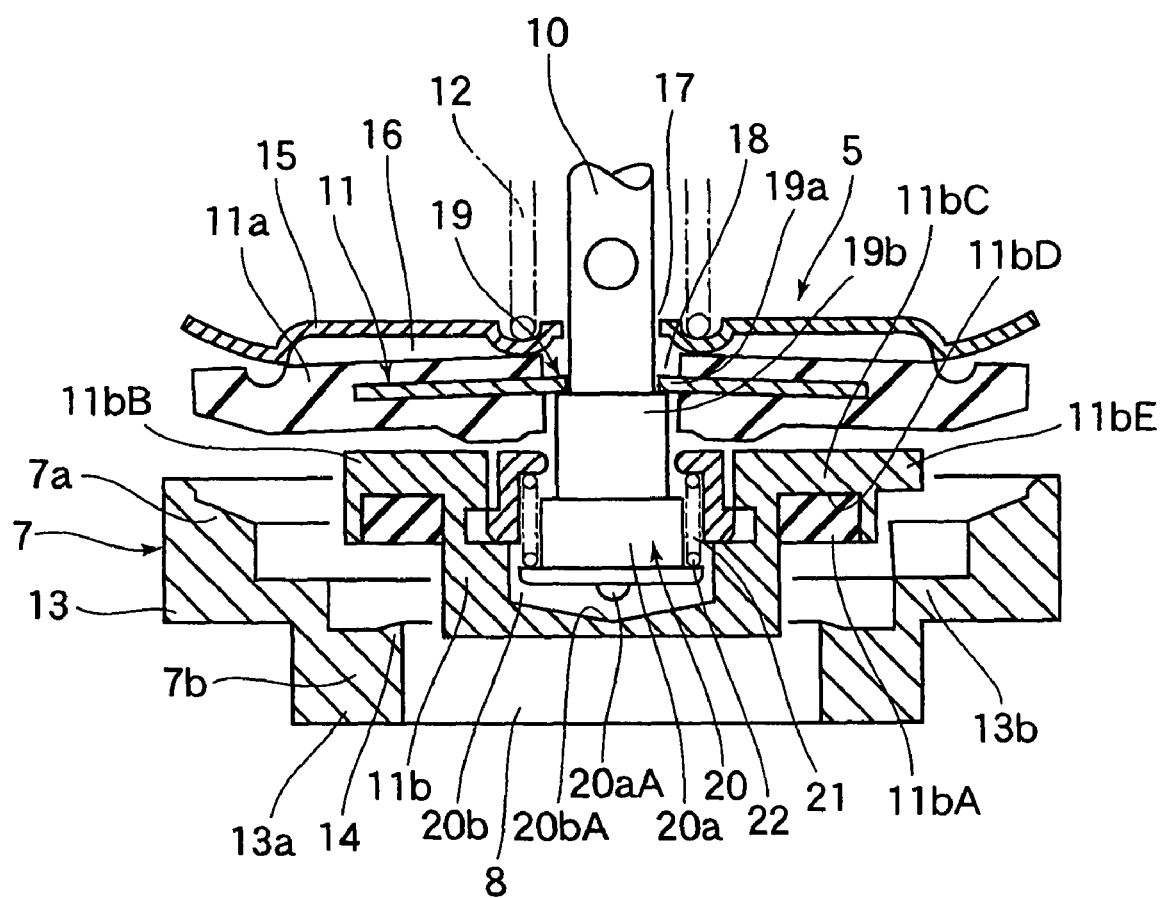
FIG. 5 is an explanatory view illustrating the valve opening operation of this example.

FIGS. 1 through 5 show the first example of a mode of the shut-off valve of the present invention, of which FIG. 1 is a longitudinal sectional view of the example, FIG. 2 is a sectional view of a valve-seat/valve-body portion of FIG. 1, FIG. 3 is a bottom view of the second valve body portion, and FIGS. 4 and 5 are explanatory views illustrating the valve opening operation.

In the shut-off valve of this example, a valve casing 1 is provided with a fluid inlet portion 2 connected to supply side piping, and a fluid outlet portion 3 connected to discharge side piping, and has, in its interior, a flow passage 4 connecting the fluid inlet portion 2 and the fluid outlet portion 3. A valve portion 5 for opening and closing the flow passage 4 is provided in the flow passage 4.

In this example, the valve portion 5 is constructed as follows.

Inside the valve casing 1, there is provided a partition 6 dividing the flow passage 4 into the fluid inlet portion 2 side and the fluid outlet portion 3 side. In the partition 6, there is provided an annular valve seat 7, and at the center of the valve seat 7, there is provided a valve hole 8 extending vertically therethrough to establish communication between the fluid inlet portion 2 side and the fluid outlet portion 3 side.

Further, inside the valve casing 1, there is provided a valve body 11 supported at the forward end of a valve operating shaft 10 connected with an electromagnetic valve opening means 9 and adapted to move axially with respect to the valve seat 7, with the valve body 11 being urged by a compression spring 12 to be held in contact with the valve seat 7 and being adapted to be separated from the valve seat 7 by the electromagnetic valve opening means 9.

The valve seat 7 is composed of a first valve seat portion 7a formed on the inlet side of the valve hole 8 as a center, and a second valve seat portion 7b formed on the outlet side and having a diameter smaller than that of the first valve seat portion 7a. The first valve seat portion 7a and the second valve seat portion 7b are both formed of a rigid material such as metal. To be more specific, the valve seat 7 is composed of a metal cylindrical member 13, and the first valve seat portion 7a is formed by the upper opening end portion of the cylindrical member 13. Further, in the inner periphery of the cylindrical member 13, there is formed a small diameter step portion 13a, and the second valve seat portion 7b is formed by the small diameter step portion 13a. In the second valve seat portion 7b, there is provided, on the contact surface to be brought into contact with a second valve body portion described below, a linear protrusion 14 protruding concentrically and annularly. Further, between the upper opening end portion and the small diameter step portion 13a of the cylindrical member 13, there is formed a medium diameter step portion 13b, and the outer periphery of the base portion of the main body portion of a second valve body portion described below is to be brought into contact with the medium diameter step portion 13b.

With respect to the valve seat 7 constructed as described above, the valve body 11 supported at the forward end of the valve operating shaft 10 is formed by separably superimposing, one upon the other, a large diameter first valve body portion 11a held in contact with the first valve seat portion 7a, and a small diameter second valve body portion 11b held in contact with the second valve seat portion 7b.

The first valve body portion 11a is formed of an elastic material such as rubber. As for the second valve body portion 11b, the portion thereof in contact with the second valve seat portion 7b is formed of an elastic material such as rubber as a valve seat contact portion 11bA, and the remaining portion thereof is formed of a rigid material such as metal as a main body portion 11bB. The valve seat contact portion 11bA is fitted into an annular groove 11bD formed in a base portion 11bC of the main body portion 11bB. The outer periphery of the base portion 11bC retaining the valve seat contact portion 11*b*A has a flange portion 11*b*E held in contact with the medium diameter step portion 13*b* formed on the cylindrical member 13 constituting the valve seat 7.

If it is in contact with the medium diameter step portion 13*b* formed on the cylindrical member 13, the flange portion 11*b*E does not prevent the first valve body portion 11*a* from coming into contact with the first valve seat portion 7*a*. Due to the fact that the flange portion 11*b*E comes into contact with the medium diameter step portion 13*b* formed on the cylindrical member 13, the linear protrusion 14 of the second valve seat portion 7*b* is prevented from being engaged to an excessive degree in the valve seat contact portion 11*b*A of the second valve body portion 11*b* that is in contact with the second valve seat portion 7*b*.

When the flange portion 11*b*E provided in the outer periphery of the base portion 11*b*C is in contact with the medium diameter step portion 13*b* formed on the cylindrical member 13, the flange portion 11*b*E has such a structure that circulation of the fluid between the flange portion 11*b*E and the medium diameter step portion 13*b* is not hindered. In this example, the flange portion 11*b*E provided in the outer periphery of the base portion 11*b*C has a cutout structure so that it may not hinder the circulation of the fluid.

On top of the first valve body portion 11*a* formed of an elastic material such as rubber, there is superimposed a disc-like valve retaining portion 15 formed of a metal plate or the like, which is urged by the compression spring 12 to bring the valve body 11 into contact with the valve seat 7, and which presses the first valve body portion 11*a* against the first valve seat portion 7*a*.

Between the valve retaining portion 15 and the first valve body portion 11*a*, there is formed a space 16 which permits the central portion of the first valve body portion 11*a* described below to be moved and deformed. Further, at the centers of the first valve body portion 11*a* and the valve retaining portion 15, there are formed through-holes 17 and 18, through which the valve operating shaft 10 is passed, with the forward end of the valve operating shaft 10 being connected to the second valve body portion 11*b*.

Between the first valve body portion 11*a* and the valve operating shaft 10, there is provided a first valve body portion moving means 19 causing, through mutual engagement, the central portion of the first valve body portion 11*a* to move away from the second valve body portion 11*b* at the time of valve opening. In this example, the first valve body portion moving means 19 is composed of a hard engagement member 19*a* provided at the center of the first valve body portion 11*a* and protruding into the through-hole 18 of the first valve body portion 11*a*, and an engagement protrusion 19*b* provided so as to protrude from the outer periphery of the valve operating shaft 10 and adapted to be engaged with the lower surface of the engagement member 19*a* at the time of valve opening. The engagement member 19*a* of this example is formed of a metal plate or the like in a disc-like configuration.

Further, at the connecting portion of the forward end of the valve operating shaft 10 and the second valve body portion 11*b*, there is provided a second valve body portion valve opening operation delaying means 20, which delays the valve opening operation of the second valve body portion 11*b* at the time of valve opening, and which gives priority to the operation of moving the first valve body portion 11*a* by the first valve body portion moving means 19. The second valve body portion valve opening operation delaying means 20 is provided with an attitude maintaining mechanism 21 for maintaining the second valve body portion 11*b* in an attitude perpendicular to the valve operating shaft 10.

In this example, the second valve body portion valve opening operation delaying means 20 is composed of a head portion 20*a* provided at the forward end of the valve operating shaft 10, and a bottomed cylindrical portion 20*b*, which is situated at the center of the main body portion 11*b*B of the second valve body portion 11*b* and arranged in the axial direction and which is fit-engaged with the head portion 20*a* so as to allow it to move in the axial direction by a predetermined dimension and prevents its detachment.

The dimension by which the head portion 20*a* moves axially within the bottomed cylindrical portion 20*b* is set to a length such that, through the movement of the valve operating shaft 10, the engagement protrusion 19*b* is engaged with the lower surface of the engagement member 19*a* to raise the central portion of the first valve body portion 11*a* away from the second valve body portion 11*b*, generating a gap between the first valve body portion 11*a* and the second valve body portion 11*b*.

The attitude maintaining mechanism 21 is provided with an attitude maintaining compression spring 22 which is provided between the opening side of the bottomed cylindrical portion 20*b* and the forward end side of the head portion 20*a*, and which urges the bottom portion 20*b*A of the bottomed cylindrical portion 20*b* so as to press it against the forward end 20*a*A of the head portion 20*a*, maintaining the second valve body portion 11*b* in an attitude perpendicular to the valve operating shaft 10 from valve opening to valve closing. Due to this construction, the bottom portion 20*b*A of the bottomed cylindrical portion 20*b* is urged by the attitude maintaining compression spring 22 so as to be pressed against the forward end of the head portion 20*a*, and the first valve body portion 11*a* and the second valve body portion 11*b* are brought into contact with each other, with the second valve body portion 11*b* being maintained in an attitude perpendicular to the valve operating shaft 10.

The compression spring 12 urging the valve body 11 so as to bring it into contact with the valve seat 7 is provided between a plunger backing plate described below and the valve retaining portion 15 superimposed on the first valve body portion 11*a*, and pushes the valve body 11 toward the valve seat 7 through the intermediation of the valve retaining portion 15.

The electromagnetic valve opening means 9 is composed of a solenoid 24 causing the electromagnetic coil 23 to act, and a plunger 25 composed of a core provided at the rear end of the valve operating shaft 10 (the upper side in FIG. 1) and adapted to be attracted to move through an electromagnetic action caused by supplying electricity to the electromagnetic coil 23. Due to the plunger 25 attracted to move by the electromagnetic action caused by supply of electricity to the electromagnetic coil 23, the valve body 11 is separated from the valve seat 7 against the elastic force of the compression spring 12. When the supply of electricity to the electromagnetic coil 23 is cut off, the plunger 25 is released from the electromagnetic action, and the valve body 11 is urged by the compression spring 12 to come into contact with the valve seat 7. The solenoid 24 is provided on the outer side of the valve casing 1, and is covered with a cover 26. Further, in order that the weight of the plunger 25 may not be put on the valve body 11 when no electricity is being supplied to the electromagnetic coil 23, the valve casing 1 is provided with a plunger backing plate 27 regulating the movement in the direction of the valve body 11.

In the shut-off valve, constructed as described above, when, at the time of valve opening, electricity is supplied to the electromagnetic coil 23, constituting the electromagnetic valve opening means 9, to energize the same, the plunger 25 is attracted by the electromagnetic force, and the valve operating shaft 10 moves away from the valve seat 7. As a result of this movement, the valve body 11 connected to the forward end of the valve operating shaft 10 moves away from the valve seat 7 against the elastic force of the compression spring 12.

The separation of the valve body 11 from the valve seat 7 at this time is effected by the following operation. Immediately after the movement of the valve operating shaft 10 away from the valve seat 7, the second valve body portion 11b does not move away from the second valve seat portion 7b but remains as it is until the head portion 20a at the valve operating shaft 10 fit-engaged with the bottomed cylindrical portion 20b provided in the main body portion 11bB of the second valve body portion 11b moves by a predetermined dimension within the bottomed cylindrical portion 20b while compressing the attitude maintaining compression spring 22 provided between the opening side of the bottomed cylindrical portion 20b and the forward end side of the head portion 20a.

Then, due to the movement of the valve operating shaft 10 in this while, the engagement protrusion 19b protruding from the outer periphery of the valve operating shaft 10 is engaged with the lower surface of the engagement member 19a provided in the central portion of the first valve body portion 11a, causing the central portion of the first valve body portion 11a to move away from the second valve body portion 11b.

The first valve body portion 11a, which has been caused to move, is formed of an elastic material, so that the central portion thereof is deformed and separated from the second valve body portion 11b, generating a gap between itself and the second valve body portion 11b. The fluid in the portion of the flow passage 4 on the upstream side of the first valve body portion 11a enters the gap thus generated between the first valve body portion 11a and the second valve body portion 11b through the through-holes 17 and 18 formed at the center of the first valve body portion 11a and of the valve retaining portion 15.

As a result, the difference in pressure between the upstream side and the downstream side of the first valve body portion 11a is eliminated, and the first valve body portion 11a is separated from the first valve seat portion 7a. Then, the head portion 20a at the forward end of the valve operating shaft 10 moves by a predetermined dimension within the bottomed cylindrical portion 20b. When it reaches the detachment preventing position, the second valve body portion 11b is separated from the second valve seat portion 7b to open the valve due to the subsequent movement of the valve operating shaft 10.

As stated above, the difference in pressure between the upstream side and the downstream side of the large diameter first valve body portion 11a is eliminated, so that the fluid pressure when the valve body 11 is separated from the valve seat 7 is received by the small diameter second valve body portion 11b. Thus, the requisite attracting force of the electromagnetic valve opening means 9 when the valve body 11 is separated from the valve seat 7 can be obtained by using as a reference the pressure reception area of the valve seat contact portion 11bA of the small diameter second valve body portion 11b, so that, as compared with the conventional shut-off valve, in which the requisite attracting force is obtained by using as a reference the pressure reception area of the large diameter first valve body portion 11a, it is possible to reduce the attracting force of the electromagnetic valve opening means 9, making it possible to achieve a reduction in the size of the electromagnetic valve opening means 9 and a reduction in cost.

When the second valve body portion 11b of the valve body 11 is separated from the second valve seat portion 7b, the flange portion 11bE of the second valve portion 11b in contact with the medium diameter step portion 13b formed on the cylindrical member 13 constituting the valve seat 7 does not hinder the circulation of fluid between the flange portion 11bE and the medium diameter step portion 13b, that is, exhibits no sealing property, so that, at the time of valve opening, the outer peripheral portion of the base portion 11bC of the second valve body portion 11b does not interfere with the valve opening operation, making it possible to reliably open the valve with a valve opening force obtained by using as a reference the pressure reception area of the valve seat contact portion 11bA of the second valve body portion 11b that is in contact with the second valve seat portion 7b.

When the second valve body portion 11b of the valve body 11 is thus separated from the second valve seat portion 7b, as the valve operating shaft 10 moves, the bottom portion 20bA of the bottomed cylindrical portion 20b is urged so as to be pressed against the forward end of the head portion 20a by the resilient force of the attitude maintaining compression spring 22 compressed by the head portion 20a at the forward end of the valve operating shaft 10 moving by a predetermined dimension within the bottomed cylindrical portion 20b, and the first valve body portion 11a and the second valve body portion 11b are brought into contact with each other, with the second valve body portion 11b being maintained in an attitude perpendicular to the valve operating shaft 10 from valve opening to the next valve closing.

Next, at the time of valve closing, when the supply of electricity to the electromagnetic coil 23 constituting the electromagnetic valve opening means 9 is cut off to cancel the energization, the valve body 11 is moved in the direction of the valve seat 7 by the resilient force of the compression spring 12, and closes the valve hole 8, thereby cutting off the flow passage 4. This cutting-off of the flow passage 4 is effected by a two-stage seal composed of the valve seat 7 formed by the first valve seat portion 7a and the second valve seat portion 7b, and the valve body 11 formed by the large diameter first valve body portion 11a and the small diameter second valve body portion 11b, so that it is possible to obtain a superior sealing property.

As stated above, the second valve body portion 11b is maintained in an attitude perpendicular to the valve operating shaft 10 by the attitude maintaining mechanism 21, so that, at the time of valve closing, the second valve body portion 11b is not tilted with respect to the valve operating shaft 10, and is directly opposed to the second valve seat portion 7b to be brought into contact therewith in the normal attitude, so it is possible to secure to a sufficient degree the sealing performance of the second valve body portion 11b and the second valve seat portion 7b at the time of valve closing.

In this example, the valve seat 7 is formed by the metal cylindrical member 13, and the first valve seat portion 7a is formed by the upper opening end of the cylindrical member 13. Further, the small diameter step portion 13a is formed in the inner periphery of the cylindrical member 13, and the second valve seat portion 7b is formed by the small diameter step portion 13a. In the second valve seat portion 7b, the linear protrusion 14 protruding concentrically and annularly is provided on the surface thereof coming into contact with the second valve body portion 11b, so that the first valve seat portion 7a and the first valve body portion 11a are brought into surface contact with each other, and the second valve seat portion 7b and the valve seat contact portion 11bA of the second valve body portion 11b are brought into line contact with each other, so that it is possible to achieve an improvement in sealing performance by the second valve seat portion 7b and the second valve body portion 11b brought into line contact with each other, and it is possible to stabilize the sealing performance by the first valve seat portion 7a and the first valve body portion 11a brought into surface contact with each other.

Figure 6:
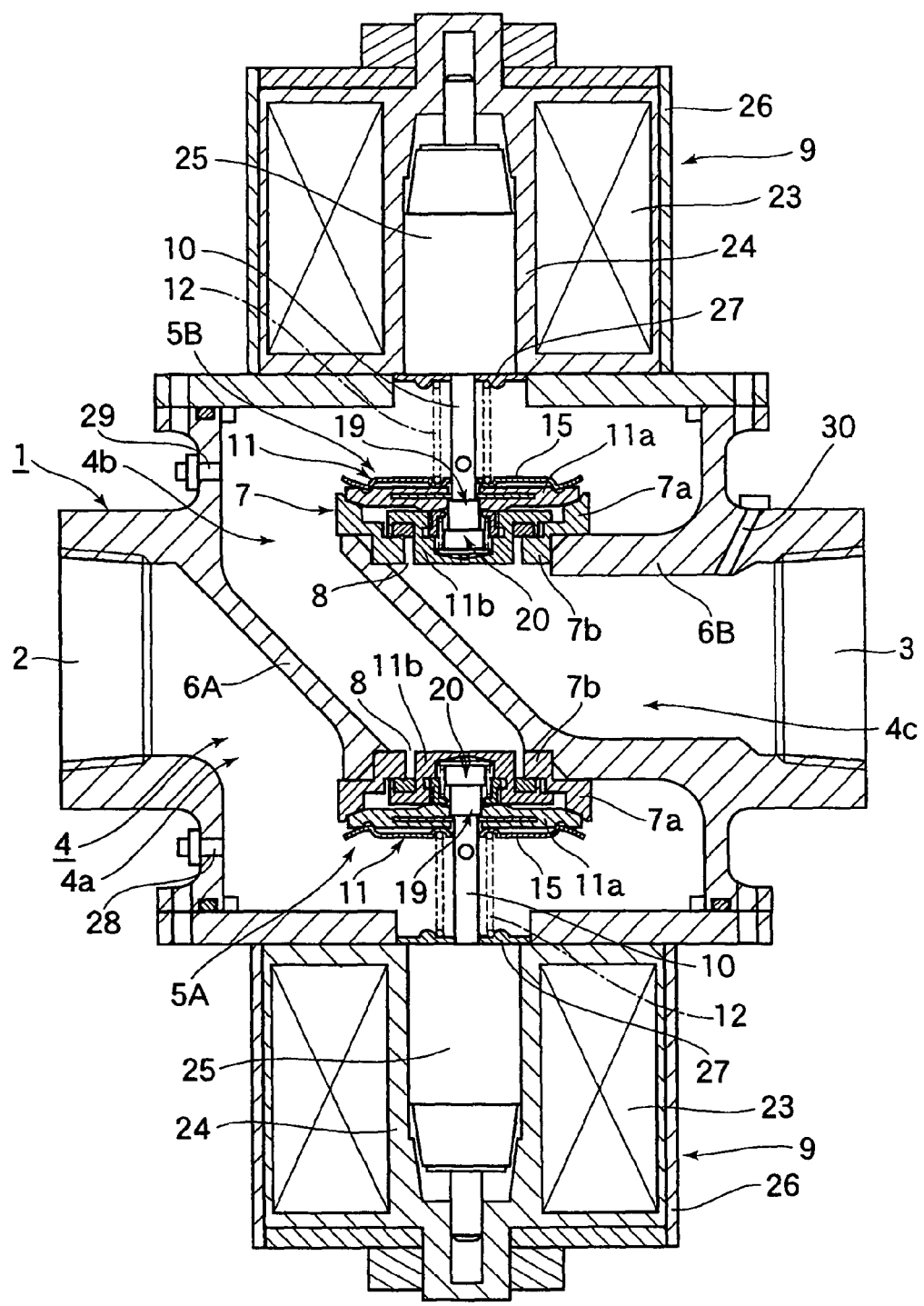
FIG. 6 is a longitudinal sectional view of a second example of a mode of the shut-off valve of the present invention.

FIG. 6 shows a second example of a mode of a shut-off valve according to the present invention. FIG. 6 is a longitudinal sectional view of this example.

In the shut-off valve of this example, the valve casing 1 is provided with the fluid inlet portion 2 connected to the supply side piping and the fluid outlet portion 3 connected to the discharge side piping. Inside the valve casing 1, there is provided the flow passage 4 connecting the fluid inlet portion 2 and the fluid outlet portion 3, and in the fluid passage 4, there are arranged in series an upstream side valve portion 5A and a downstream side valve portion 5B, which open and close the flow passage 4.

In this example, partitions 6A and 6B dividing the flow passage 4 are provided in series in the valve casing 1 with respect to the flow passage 4. The upstream side valve portion 5A is provided in the partition 6A situated on the upstream side, and the downstream side valve portion 5B is provided in the partition 6B situated on the downstream side.

The upstream side valve portion 5A and the downstream side valve portion 5B are of a construction similar to that of the valve portion 5 of the first example described above, so that the equivalent components are indicated by the same reference numerals as in the case of the valve portion 5 of the first example, and a detailed description of the upstream side valve portion 5A and the downstream side valve portion 5B will be omitted, quoting the description of the valve 5 of the first example.

In this example, in the flow passage 4a on the upstream side of the upstream side valve portion 5A, there is provided an upstream side pressure sensor 28 for detecting the pressure in the flow passage 4a. In the flow passage 4b between the upstream side valve portion 5A and the downstream side valve portion 5B, there is provided a midstream portion pressure sensor 29 for detecting the pressure in the flow passage 4b, and in the flow passage 4c on the downstream side of the downstream side valve portion 5B, there is provided a downstream side pressure sensor 30 for detecting the pressure in the flow passage 4c.

In the shut-off valve constructed as described above, the valve opening and valve closing operations of the upstream side valve portion 5A and the downstream side valve portion 5B are conducted in the same manner as in the case of the valve portion 5 of the first example. In performing the valve opening operations, it does not particularly matter which of the upstream side valve portion 5A and the downstream side valve portion 5B is operated first, or if they are operated simultaneously. In performing the valve closing operations, it is desirable to operate the upstream side valve portion 5A first to close the upstream side valve portion 5A, and then to close the downstream side valve portion 5B.

Due to this arrangement, by closing the upstream side valve portion 5A, the fluid between the upstream side valve portion 5A and the downstream side valve portion 5B and the fluid on the downstream side of the downstream side valve portion 5B are discharged to cause a reduction in pressure, and in this state, the downstream side valve portion 5B is closed, so that it is possible to reliably attain the valve-closed state for both the upstream side valve portion 5A and the downstream side valve portion 5B.

In this way, in this example, the flow passage 4 is cut off by the upstream side valve portion 5A and the downstream side valve portion 5B, so that it is possible to obtain a shut-off valve superior in shut-off property. Then, each of the upstream side valve portion 5A and the downstream side valve portion 5B is composed of the valve seat 7 dividing the flow passage 4, the valve operating shaft 10 supporting the valve body 11 with its forward end, the compression spring 12 axially urging the valve body 11 supported by the valve operating shaft 10 toward the valve seat 7 to bring it into contact with the valve seat 7, and the electromagnetic valve opening means 9 connected to the rear end of the valve operating shaft 10 and adapted to separate the valve body 11 from the valve seat 7 by electromagnetic force, and each of them exists independently, so that if fluid leakage should occur in one of the upstream side valve portion 5A and the downstream side valve portion 5B, the other valve portion shuts off the flow passage 4, so that it is possible to obtain a shut-off valve of a high level of safety.

Further, in this example, in the flow passage 4a on the upstream side of the upstream side valve portion 5A, there is arranged the upstream side pressure sensor 28 for detecting the pressure in the flow passage 4a, and in the flow passage 4b between the upstream side valve portion 5A and the downstream side valve portion 5B, there is arranged the midstream portion pressure sensor 29 for detecting the pressure in the flow passage 4b, and in the flow passage 4c on the downstream side of the downstream side valve portion 5B, there is provided the downstream side pressure sensor 30 for detecting the pressure in the flow passage 4c, so that, by detecting the pressure in the flow passage 4a on the upstream side of the upstream side valve portion 5A in the flow passage 4, the pressure in the flow passage 4b between the upstream side valve portion 5A and the downstream side valve portion 5B, and the pressure in the flow passage 4c on the downstream side of the downstream side valve portion 5B, it is possible to make a judgment as to whether there is any leakage in the upstream side valve portion 5A and the downstream side valve portion 5B based on the pressures measured.

That is, assuming that the pressure in the flow passage 4a on the upstream side of the upstream side valve portion 5A is X, that the pressure in the flow passage 4b between the upstream side valve portion 5A and the downstream side valve portion 5B is Y, and that the pressure in the flow passage 4c on the downstream side of the downstream side valve portion 5B is Z, it is possible to make a judgment as follows:

when X>Y=Z, there is fluid leakage in none of the upstream side valve portion 5A and the downstream side valve portion 5B;

when X=Y>Z, there is fluid leakage in the upstream side valve portion 5A; and when X=Y=Z, there is fluid leakage in both the upstream side valve portion 5A and the downstream side valve portion 5B.

In this way, it is possible to make a judgment as to whether there is any fluid leakage in the upstream side valve portion 5A and the downstream side valve portion 5B based on the pressures measured, making it possible to obtain a shut-off valve of a still higher level of safety.

The invention claimed is:

1. A shut-off valve in which a valve seat is provided in a flow passage of a valve casing equipped with a fluid inlet and a fluid outlet, and in which a valve body, supported at a forward end of a valve operating shaft connected to electromagnetic opening/closing means and adapted to move axially with respect to the valve seat, is urged by a compression spring to be brought into contact with the valve seat, and is separated from the valve seat by the electromagnetic opening/closing means, wherein the valve seat is composed of a first valve seat portion formed on an inlet side of a valve hole at a center, and a second valve seat portion formed on an outlet side of the valve hole and of a smaller diameter than the first valve seat portion, wherein the valve body is composed of two valve body portions separably superimposed one upon the other, that is, a first valve body portion with a large diameter in contact with the first valve seat portion, and a second valve body portion with a small diameter in contact with the second valve seat portion, wherein the first valve body portion is formed of an elastic material, whereas at least a portion of the second valve body portion other than a remaining portion thereof in contact with the second valve seat portion is formed of a rigid material wherein a through-hole through which the valve operating shaft is passed is formed at a center of the first valve body portion, wherein the forward end of the valve operating shaft passed through the through-hole is connected to the second valve body portion, wherein, between the first valve body portion and the valve operating shaft, a first valve body portion moving means is provided, which is adapted to make mutual engagement at the time of valve opening to cause a central portion of the first valve body portion to move away from the second valve body portion, and wherein, at the position where the forward end of the valve operating shaft and the second valve body portion are connected together, a second valve body portion valve opening operation delaying means is provided, which, at the time of valve opening, delays the valve opening operation of the second valve body portion, and gives priority to the operation of moving the first valve body portion by the first valve body portion moving means, wherein the portion of the second valve body portion in contact with the second valve seat portion is formed of an elastic material as a valve seat contact portion, and the remaining portion thereof is formed of a rigid material as a main body portion, and wherein an outer peripheral portion of a base portion of the main body portion retaining the valve seat contact portion does not hinder circulation of a fluid having passed through the through-hole of the first valve body portion at the time of valve opening.

2. A shut-off valve according to claim 1, wherein the portion of the second valve body portion which is in contact with the second valve seat portion is formed of an elastic material.

3. A shut-off valve according to claim 1 or 2, wherein the first valve seat portion and the first valve body portion are held in surface contact with each other, and wherein the second seat portion and the second valve body portion are held in line contact with each other.

4. A shut-off valve according to claim 1, wherein the outer peripheral portion of the base portion of the main body portion retaining the valve seat contact portion is cut out so that it may not hinder circulation of the fluid having passed through the through-hole of the first valve body portion at the time of valve opening.

5. A shut-off valve according to claim 1, wherein the second valve body portion valve opening operation delaying means is provided with an attitude maintaining mechanism for maintaining the second valve body portion in an attitude perpendicular to the valve operating shaft from valve opening to valve closing.

6. A shut-off valve according to claim 5, wherein the second valve body portion valve opening operation delaying means provided with the attitude maintaining mechanism is composed of a head portion provided at the forward end of the valve operating shaft and a bottomed cylindrical portion provided in the second valve body portion, fit-engaged with the head portion so as to allow axial movement by a predetermined dimension and prevent detachment, and wherein, between an opening side of the bottomed cylindrical portion and a forward end side of the head portion, an attitude maintaining compression spring is provided, which urges a bottom portion of the bottomed cylindrical portion to press against the forward end of the head portion and which maintains the second valve body portion in an attitude perpendicular to the valve operating shaft from valve opening to valve closing, thus forming the attitude maintaining mechanism.

7. A valve device comprising a valve portion composed of an upstream side valve portion and a downstream side valve portion incorporated in series into the flow passage of the valve casing provided with the fluid inlet and the fluid outlet, each of said upstream valve portion said downstream valve portion includes the shut-off valve according to claim 1.

8. The valve device according to claim 7, wherein, in the flow passage portion on an upstream side of the upstream side valve portion, there is arranged an upstream side pressure sensor for detecting a pressure in the flow passage portion, wherein, in the flow passage portion between the upstream side valve portion and the downstream side valve portion, there is arranged a midstream portion pressure sensor for detecting the pressure in the flow passage portion, and wherein, in the flow passage portion on a downstream side of the downstream side valve portion, there is arranged a downstream side pressure sensor for detecting the pressure in the flow passage portion.

9. The shut-off valve according to claim 1, wherein the second valve seat portion has a linear protrusion concentrically and annularly formed at a point that contacts said second valve body portion.

10. A shut-off valve in which a valve seat is provided in a flow passage of a valve casing equipped with a fluid inlet and a fluid outlet, and in which a valve body, supported at a forward end of a valve operating shaft connected to electromagnetic opening/closing means and adapted to move axially with respect to the valve seat, is urged by a compression spring to be brought into contact with the valve seat, and is separated from the valve seat by the electromagnetic opening/closing means, wherein the valve seat is composed of a first valve seat portion formed on an inlet side of a valve hole at a center, and a second valve seat portion formed on an outlet side of the valve hole and of a smaller diameter than the first valve seat portion, wherein the valve body is composed of two valve body portions separably superimposed one upon the other, that is, a first valve body portion with a large diameter in contact with the first valve seat portion, and a second valve body portion with a small diameter in contact with the second valve seat portion, wherein the first valve body portion is formed of an elastic material, whereas at least a portion of the second valve body portion other than a portion thereof in contact with the second valve seat portion is formed of a rigid material, wherein a through-hole through which the valve operating shaft is passed is formed at a center of the first valve body portion, wherein the forward end of the valve operating shaft passed through the through-hole is connected to the second valve body portion, wherein, between the first valve body portion and the valve operating shaft, a first valve body portion moving means is provided, which is adapted to make mutual engagement at the time of valve opening to cause a central portion of the first valve body portion to move away from the second valve body portion, and wherein, at the position where the forward end of the valve operating shaft and the second valve body portion are connected together, a second valve body portion valve opening operation delaying means is provided, which, at the time of valve opening, delays the valve opening operation of the second valve body portion, and gives priority to the operation of moving the first valve body portion by the first valve body portion moving means, wherein the first valve body portion moving means provided between the first valve body portion and the valve operating shaft is composed of a hard engagement member provided at the center of the first valve body portion and protruding into the through-hole of the first valve body portion, and an engagement protrusion protruding from an outer periphery of the valve operating shaft and engaged with a lower surface of the hard engagement member at the time of valve opening.

* * * * *